(12) United States Patent
Jacob (10) Patent No.: US 7,703,479 B2
(45) Date of Patent: Apr. 27, 2010

(54) PLASMA ACTUATOR

(75) Inventor: Jamey D. Jacob, Stillwater, OK (US)

(73) Assignee: The University of Kentucky Research Foundation, Lexington, KY (US)

( * ) Notice: Subject to any disclaimer, the term of this patent is extended or adjusted under 35 U.S.C. 154(b) by 711 days.

(21) Appl. No.: 11/581,932

(22) Filed: Oct. 17, 2006

(65) Prior Publication Data

US 2007/0089795 A1    Apr. 26, 2007

Related U.S. Application Data

(60) Provisional application No. 60/727,364, filed on Oct. 17, 2005.

(51) Int. Cl.
F15C 1/04    (2006.01)

(52) U.S. Cl. .................. 137/828; 417/48; 244/130; 244/207

(58) Field of Classification Search ........ 137/827, 137/825, 826, 828; 417/49, 50, 48; 239/690, 239/690.1; 361/227, 228; 244/205, 207, 244/130

See application file for complete search history.

(56) References Cited

U.S. PATENT DOCUMENTS

| | | | |
|---|---|---|---|
| 1,773,969 A | 8/1930 | Dreyfus et al. | |
| 3,281,324 A | 10/1966 | Henins et al. | |
| 4,828,184 A | 5/1989 | Gardner et al. | |
| 5,040,560 A | 8/1991 | Glezer et al. | |
| 5,060,867 A | 10/1991 | Luxton et al. | |
| 5,414,324 A | 5/1995 | Roth et al. | |
| 5,622,611 A | 4/1997 | Marks et al. | |
| 5,758,823 A | 6/1998 | Glezer et al. | |
| 5,885,358 A | 3/1999 | Maydan et al. | |
| 5,894,990 A | 4/1999 | Glezer et al. | |
| 5,921,757 A | 7/1999 | Tsutsui et al. | |
| 5,988,522 A | 11/1999 | Glezer et al. | |
| 6,056,204 A | 5/2000 | Glezer et al. | |
| 6,123,145 A | 9/2000 | Glezer et al. | |
| 6,315,216 B1 | 11/2001 | Boecking | |
| 6,431,112 B1 * | 8/2002 | Sill et al. | 118/723 E |
| 6,457,654 B1 | 10/2002 | Glezer et al. | |
| 6,474,570 B2 | 11/2002 | Chen | |
| 6,540,203 B1 | 4/2003 | Hunnicutt | |

(Continued)

FOREIGN PATENT DOCUMENTS

JP    61054248    3/1986

(Continued)

OTHER PUBLICATIONS

"Flow Control Using Plasma Actuators and Lnear/Annular Plasma Synthetic Jet Actuators" by Arvind Santhanakrishnan and Jamey Jacob, published 2006.*

(Continued)

*Primary Examiner*—John Rivell
*Assistant Examiner*—Craig M Schneider
(74) *Attorney, Agent, or Firm*—King & Schickli, PLLC (57) ABSTRACT

An actuator including a first and second conductor on a dielectric, wherein application of a voltage to the first conductor creates a plasma, thereby modifying a fluid flow in communication with the actuator. Related systems and methods are also provided.

25 Claims, 9 Drawing Sheets

U.S. PATENT DOCUMENTS

| | | | |
|---|---|---|---|
| 6,550,691 B2 | 4/2003 | Pence | |
| 6,570,333 B1 * | 5/2003 | Miller et al. | 315/111.21 |
| 6,619,788 B2 | 9/2003 | Condie | |
| 6,685,102 B1 | 2/2004 | Mi et al. | |
| 6,722,581 B2 | 4/2004 | Saddoughi | |
| 6,848,631 B2 | 2/2005 | Monson et al. | |
| 6,872,259 B2 | 3/2005 | Strang | |
| 6,959,471 B2 | 11/2005 | Temple et al. | |
| 7,380,756 B1 * | 6/2008 | Enloe et al. | 244/175 |
| 2001/0010257 A1 | 8/2001 | Ni et al. | |
| 2002/0081198 A1 | 6/2002 | Hassan et al. | |
| 2004/0021041 A1 | 2/2004 | Grossman et al. | |
| 2005/0074662 A1 | 4/2005 | Cho et al. | |
| 2005/0111185 A1 | 5/2005 | Bhattacharya et al. | |
| 2005/0127780 A1 | 6/2005 | Ifuku et al. | |

FOREIGN PATENT DOCUMENTS

| | | |
|---|---|---|
| JP | 2000208929 | 7/2000 |
| JP | 2002069603 | 3/2002 |
| WO | WO9622841 | 8/1996 |
| WO | WO9926457 | 5/1999 |

OTHER PUBLICATIONS

"Flow control with plasma synthetic jet actuators" by Arvind Santhanakrishnan and Jamey Jacob, published Jan. 19, 2007.*

Presentation titled "Effectiveness of Plasma Actuators as Flow Control Devices in Low Pressure Turbine Blades" by Karthik Ramakumar and Jamey Jacob, dated Mar. 7, 2006.*

Jamey D. Jacob and Karthik Ramakumar, Control of Laminar and Turbulent Shear Flows Using Plasma Actuators, 4th International Symposium on Turbulence and Shear Flow Phenomena, Jun. 27-29, 2005, 6 pgs, Williamsburg, VA.

Ari Glezer and Michael Amitay, Synthetic Jets, Annu. Rev. Fluid Mech., 2002, pp. 503-529, Annual Reviews.

Martiqua L. Post and Thomas C. Corke, Flow Control with Single Dielectric Barrier Plasma Actuators, 35th Fluid Dynamics Conference and Exhibit, Jun. 6, 2005, 19 pgs., Toronto, Canada.

* cited by examiner

PLASMA ACTUATOR

This application claims the benefit of U.S. Provisional Patent Application No. 60/727,364 filed Oct. 17, 2005, the disclosure of which is herein incorporated by reference.

TECHNICAL FIELD

The present invention relates to a fluid actuator and, more particularly, to a plasma actuator for manipulating, controlling and/or modifying a fluid flow.

BACKGROUND OF THE INVENTION

The ability to manipulate, control, and/or modify (collectively, "modify") a fluid flow is important for increasing the performance of, or otherwise altering, a fluid system. Some previous attempts to modify fluid flows have focused on passive flow controls (i.e., where an input of external energy is not required). Some of the known passive controls include boundary layer trips, roughness elements, ejector nozzles, and surface perturbations. These passive controls often create turbulence or disruption in the fluid flow. Since these passive methods do not include any form of external energy input, they do not allow for activation and deactivation of the control. This limits the amount of flow control and does not allow a user to manipulate the flow as desired.

To increase the amount of control, other attempts to modify fluid flow have focused on active flow controls (i.e., requiring an input of external energy). These types of controls enable a user to activate and deactivate the flow control, as desired. Some examples of these controls include acoustic excitation, continuous or pulsed suction and blowing, and surface motion. Similar to the passive controls, these create a turbulence or disruption in the fluid flow. Unfortunately, these active flow controls require moving parts, such as diaphragms or pumps to effectuate the flow control. Over time, these moving parts can fail. Other types of active flow controls require a structure that projects into the fluid flow. This projection can disturb the fluid flow over a surface. For instance, in certain aerospace designs, it is undesirable to have a structure projecting into the air flow. Such structures can negatively impact the desired lifting or other properties of the aerospace structure.

Accordingly, a fluid actuator is needed that can modify a flow of fluid without the need for moving parts. The actuator would allow for activation and deactivation, as desired. The actuator would also be capable of being mounted substantially flush with a surface, such that it may modify the flow without significantly projecting into it. The actuator would also be able to operate as a synthetic jet (such as, an actuator that injects fluid with zero net mass but finite momentum) for directing flow away from the actuator, as well as a suction device for directing flow toward the actuator.

SUMMARY OF THE INVENTION

In accordance with one aspect of the invention, a fluid actuator is disclosed. The actuator comprises a first and second conductor on a dielectric. Application of a voltage to the first conductor creates a plasma and a fluid flow away from the actuator. Application of a voltage to the second conductor creates a plasma and a fluid flow toward the actuator.

In one embodiment, the fluid actuator comprises a first and second conductor positioned on a dielectric. One of the first and second conductor defines an aperture. Application of a voltage to the first conductor creates a plasma between the first and second conductor, thereby modifying a flow of a fluid in communication with the actuator. Application of the voltage to the first conductor may result in a fluid flow away from the actuator. Application of the voltage to the first conductor may result in a fluid flow toward the actuator. The first conductor may be substantially ring shaped and the second conductor may be circular. The actuator may also include a gap between the first conductor and the second conductor. The first conductor may encircle the second conductor.

In accordance with a second aspect of the invention, a system for modifying a fluid flow is disclosed. The system comprises a surface, and an actuator including a first and second conductor positioned on a dielectric. The actuator is connected to the surface and application of a voltage to the first conductor creates a plasma between the first and second conductor. The actuator may be substantially flush with the surface. One of the first and second conductor may define an aperture. The first conductor may be substantially ring shaped and the second conductor may be circular. In one embodiment, the first and second conductor are substantially "v"-shaped. The application of the voltage to the first conductor may result in a fluid flow away from the actuator. The application of the voltage to the first conductor may result in a fluid flow toward the actuator. One of the first and second conductor may be embedded in the surface. The surface may include a plurality of actuators, each independently controlled.

In accordance with a third aspect of the invention, a method of modifying a flow of fluid is disclosed. The method comprises mounting a plurality of conductors on a surface, applying a voltage to at least one of the conductors, and creating a synthetic jet actuator with the plurality of conductors, thereby resulting in a fluid flow away from the surface. The mounting may comprise positioning the plurality of conductors substantially flush with the surface. The applying a voltage may comprise applying a substantially continuous voltage during the creating the synthetic jet actuator. The applying a voltage may comprise pulsing the voltage during the creating the synthetic jet actuator.

In accordance with a fourth aspect of the invention, a method of modifying a flow of fluid is disclosed. The method comprises mounting a plurality of conductors on a surface, applying a voltage to at least one of the conductors, and creating a suction device with the plurality of conductors, thereby resulting in a fluid flow toward the surface. The mounting may comprise positioning the plurality of conductors substantially flush with the surface. The applying a voltage may comprise applying a substantially continuous voltage during the creating the suction device. The applying a voltage may comprise pulsing the voltage during the creating the suction device.

In accordance with a fifth aspect of the invention, a fluid actuator is disclosed. The fluid actuator comprises a first conductor positioned on a first side of a dielectric. The first conductor has at least one edge that defines a boundary. The fluid actuator also comprises a second conductor positioned on a second side of a dielectric, wherein the second conductor is positioned within the boundary, and application of a voltage to one of the first and second conductor creates a plasma, thereby modifying a flow of fluid in communication with one of the first and second conductor.

In accordance with a sixth aspect of the invention, a method of modifying a flow of fluid is disclosed. The method comprises mounting a first conductor on a first side of a dielectric, the first conductor having at least one edge that defines a boundary. The method also comprises mounting a second conductor on a second side of a dielectric, the second conductor is positioned within the boundary. The method also comprises applying a voltage to at least one of the conductors to modify a flow of fluid in communication with one of the first and second conductor.

The following drawings pertain to one possible embodiment of this invention, and are merely designed to illustrate one of the modes best suited to carry out the invention. As it will be realized, the invention is capable of other different embodiments, and its several details are capable of modification in various, obvious aspects all without departing from the invention. Accordingly, the drawings and descriptions will be regarded as illustrative in nature and not as restrictive.

BRIEF DESCRIPTION OF THE DRAWINGS

The accompanying drawings incorporated in and forming a part of the specification, illustrate several aspects of the present invention, and together with the description serve to explain the principles of the invention. In the drawings:

FIG. 1b is a side cutaway view taken along the line A-A of the actuator of FIG. 1a;

FIG. 2b is side cutaway view taken along the line B-B of the actuator of FIG. 2a;

FIG. 3b is a side cutaway view taken along the line C-C of the actuator of FIG. 3a;

DETAILED DESCRIPTION OF THE INVENTION

Figure 1A:
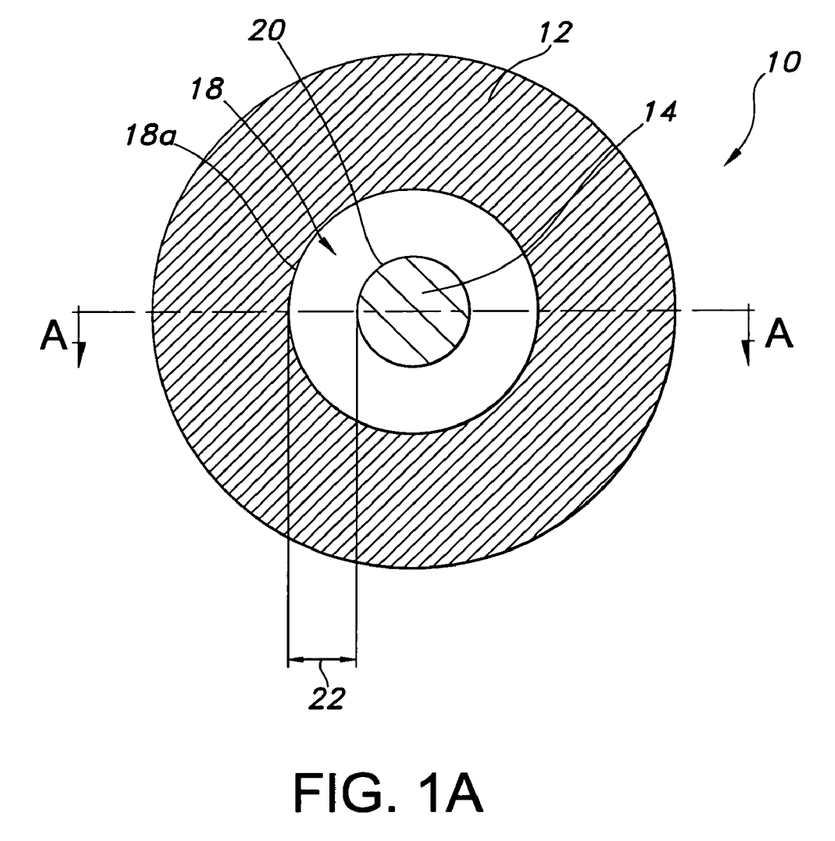
FIG. 1a is a top view of an actuator in accordance with one possible embodiment of the present invention disclosed herein.
Figure 1B:
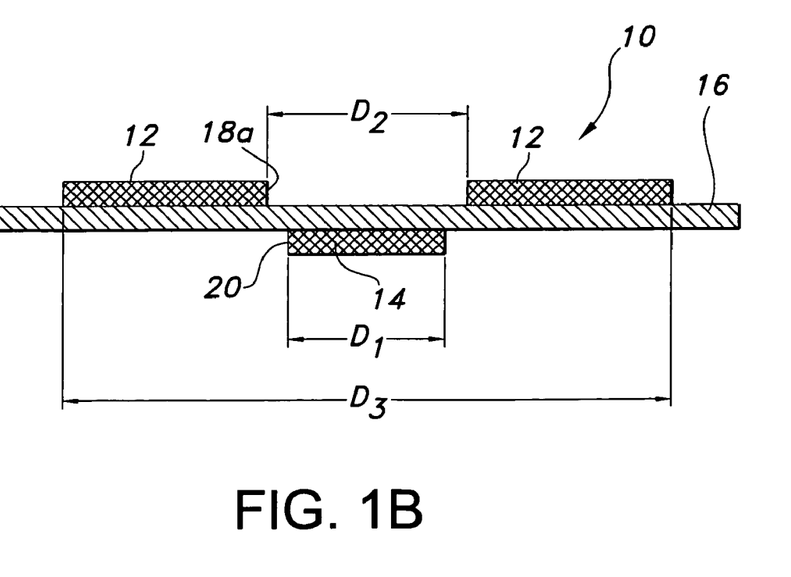

FIGS. 1 and 1a illustrate one possible embodiment of the inventive plasma actuator 10 of the present invention. When electrically activated, the actuator 10 produces a plasma that modifies a fluid flow in communication with the actuator 10. For example, it is envisioned that the actuator 10 may be used on an aerospace surface, such as an airfoil, for modifying the flow of air over the airfoil.

The actuator 10 includes first and second conductors 12, 14 separated by a dielectric 16. Preferably, the conductors 12, 14 are positioned on opposite sides of the dielectric 16 (see FIG. 1a). This configuration enables the actuator 10 to be installed substantially flush on a surface, as discussed below. As illustrated, the actuator 10 has an annular configuration with the first conductor 12 having the shape of a ring and the second conductor 14 having a substantially circular shape having a diameter $D_1$. The center aperture 18 of the ring has a diameter $D_2$ and defines an edge 18a. When $D_2$ is greater than $D_1$, a gap 22 is formed between the edge 18a and an exterior edge 20 of the second conductor 14. In one embodiment, the diameter $D_2$ is approximately 0.504", while the diameter $D_1$ is approximately 0.5". This provides a gap 22 of approximately 0.4". Varying this gap 22 and the electrical power delivered to the actuator 10 enables a user to create various configurations of plasma synthetic jets or suction devices, as discussed below in further detail. Although the actuator 10 may be any size, in one embodiment, the outer diameter $D_3$ of the conductor 12 is approximately 1".

The conductors 12, 14 may be formed of any conductive or semi-conductive material. In one embodiment, they are formed from copper tape having a thickness between 0.001"-0.01". The copper tape includes an adhesive backing that enables affixation to the dielectric. Alternatively, the conductors 12, 14 may be etched directly onto the dielectric. For instance, copper coated surfaces may be surface etched using vapor deposition techniques, e.g., such as sputtering with a shadow mask typically used in semi-conductor manufacturing. In that case, the thickness of the conductors is between 0.00001"-0.05". Preferably, the conductors 12, 14 are a uniform thickness and each conductor has the same thickness. However, the conductors 12, 14 could have a variable thickness and/or each conductor 12, 14 may be configured with a different thickness.

The dielectric 16 may be formed of any material having minimal or substantially no electrical conductivity. For instance, it may be formed from KAPTON, TEFLON, alumina ceramic, paper phenolic, acrylic, polycarbonate, or glass. Preferably, the dielectric would have a thickness between 0.001" and 0.25". Similar to the conductors 12, 14, the dielectric 16 preferably has a uniform thickness. However, the dielectric 16 could have a variable thickness.

Figure 2A:
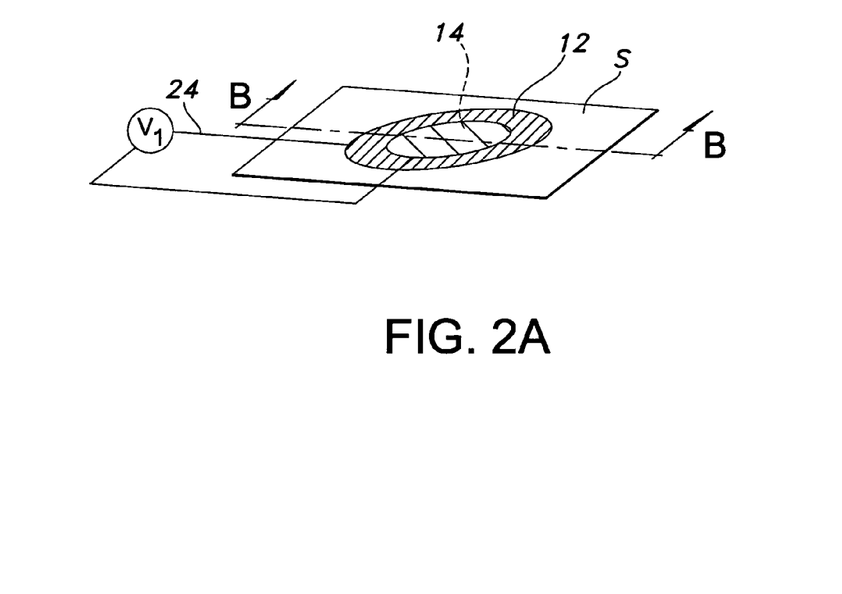
FIG. 2a is a perspective view of the actuator of FIG. 1a configured as a synthetic jet.
Figure 2B:
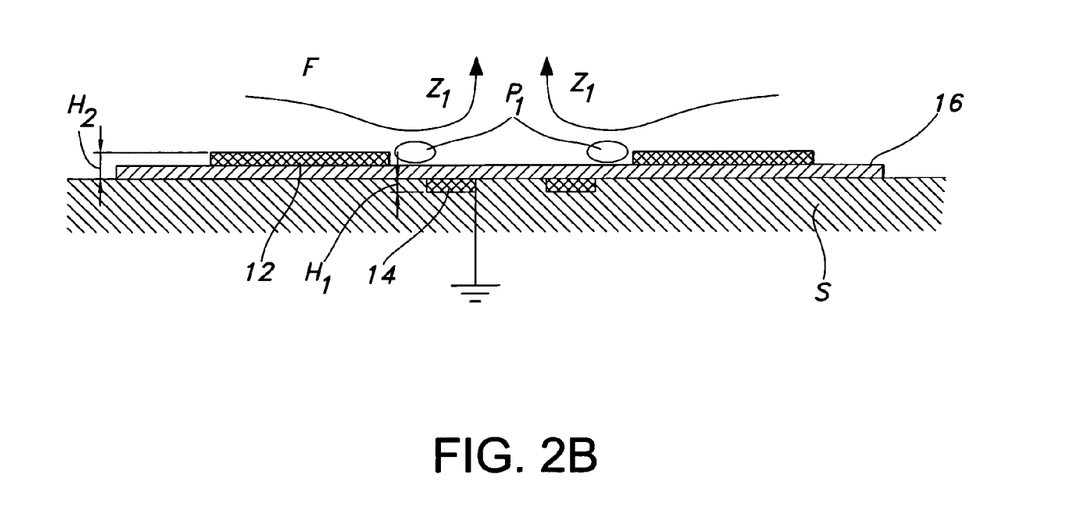
Figure 3A:
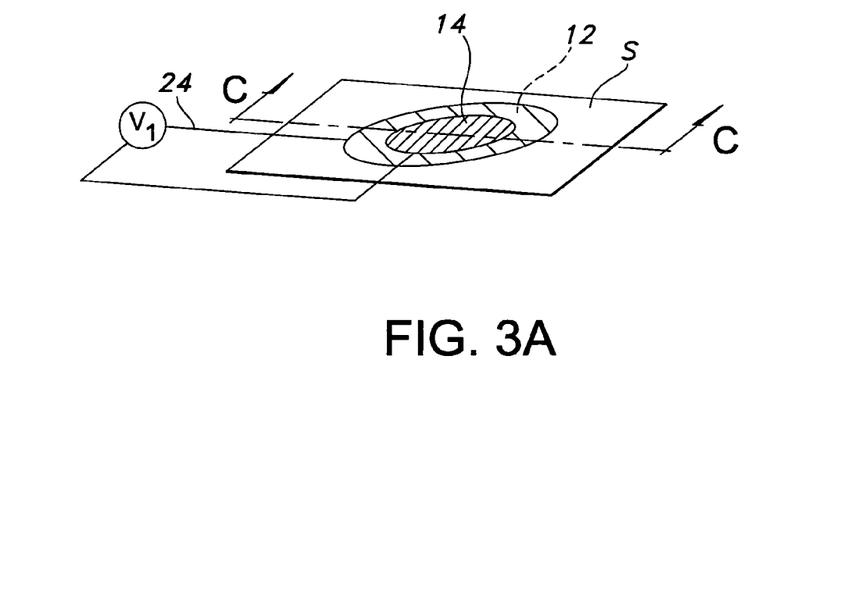
FIG. 3a is a perspective view of the actuator of FIG. 1a configured as a suction device.
Figure 3B:
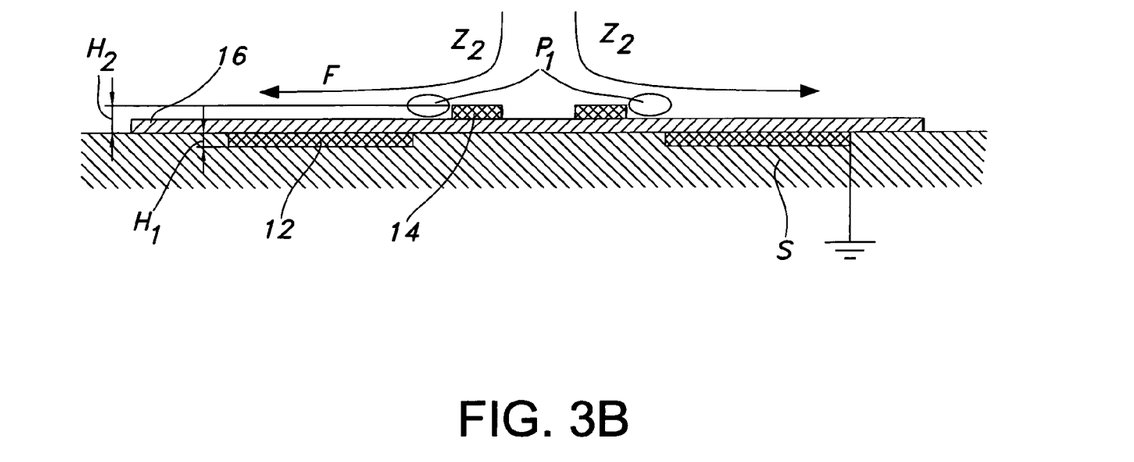

To install the actuator 10, a user will affix the dielectric 16 bearing the first and second conductors 12, 14 to a surface S in communication with a fluid flow that the user desires to modify. In one embodiment, the surface S comprises an aerospace surface, wherein the fluid flow would be air, fuel, or a combination of air and fuel. The user may accomplish this by using an adhesive, a mechanical fastener, welding, brazing, or otherwise. Once fixed on the surface, the actuator will have either the first or second conductor 12, 14 exposed to the ambient fluid F that the user desires to modify, with the other contacting the surface S. FIG. 2a illustrates the first conductor 12 exposed to the fluid F, while FIG. 3a illustrates the second conductor 14 exposed to the fluid F. In some instances, it may be desirable to embed one of the conductors in the surface S, such as a distance $H_1$ from the surface S. One will appreciate that unlike prior devices, the present actuator is substantially flush with the surface S when installed, such as the height $H_2$ from the surface S (FIGS. 2b and 3b).

At this point, one of the conductors 12, 14 becomes placed in electrical communication with a power source, while the other becomes grounded. This presents another advantage of the present invention, namely, that a user may configure the actuator 10 for use as either a synthetic jet or as a suction device. To configure the actuator 10 as a synthetic jet, a user positions the first conductor 12 in communication with the fluid F, places the second conductor 14 in contact with the surface S, applies a voltage $V_1$ to the first conductor 12, and grounds the second conductor 14 (FIG. 2a). A skilled artisan will appreciate that these steps may be completed in any order or simultaneously. Application of the voltage creates the plasma $P_1$, as represented in FIG. 2b. In this arrangement, fluid F flows away from the actuator in the direction $Z_1$ (FIG. 2b). Reversing this configuration, such that the second conductor 14 resides in communication with the ambient fluid F, the first conductor 12 contacts the surface S, and a user applies a voltage $V_1$ to the second conductor 14, while grounding the first conductor 12, results in the actuator acting as a suction device (FIG. 3a). Again, a skilled artisan will appreciate that these steps may be completed in any order or simultaneously. Application of the voltage creates the plasma $P_1$, as represented in FIG. 3b. In this configuration, the fluid F flows toward the actuator in the direction $Z_2$.

Figure 4:
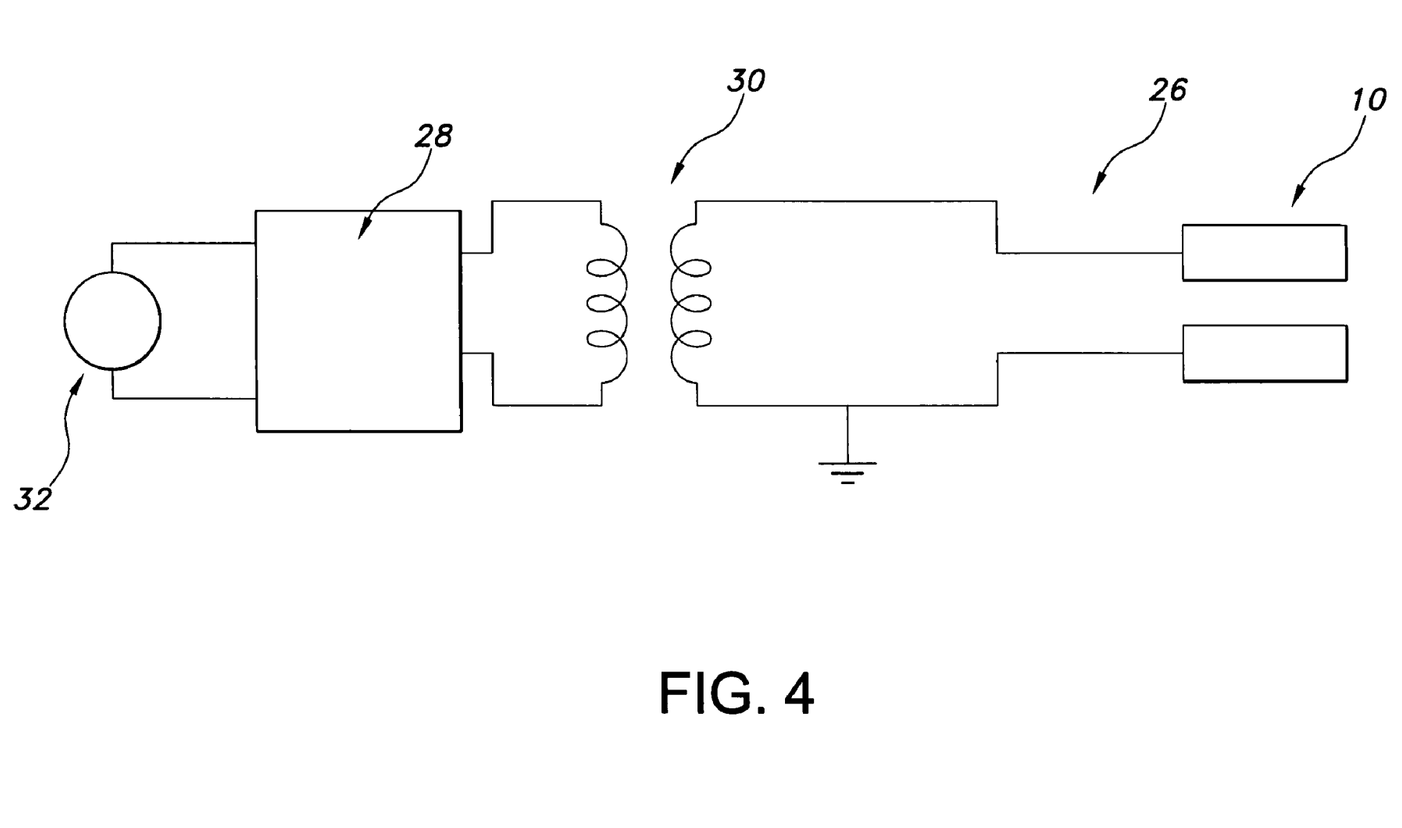
FIG. 4 is a representative schematic of a power circuit.

The conductors 12, 14 may receive electrical power in any known manner. In one embodiment, an electrode 24 contacts one of the conductors 12, 14 and delivers electrical power from a power circuit 26 (FIGS. 2a, 3a). This electrode 24 may be formed from the same material as the conductors 12, 14, or any other material that enables it to deliver electrical power. FIG. 4 illustrates a representative power circuit 26 containing a power source 28, a transformer 30, and a function generator 32. In one embodiment, the power source 28 is a KEPCO 1-200V programmable power source and the transformer 30 is a 250 V primary/6 kV secondary step-up transformer. The function generator 32 may be integral with the power source 28 and provide a 3-5 kHz sine, square, or triangular wave input. The power circuit 26 may be a direct or alternating current circuit. Preferably, at least 1 kV would be delivered to one of the conductors 12, 14, however, any voltage and power circuit may be used, as long as it delivers enough voltage to create a plasma may be used.

Figure 5A:
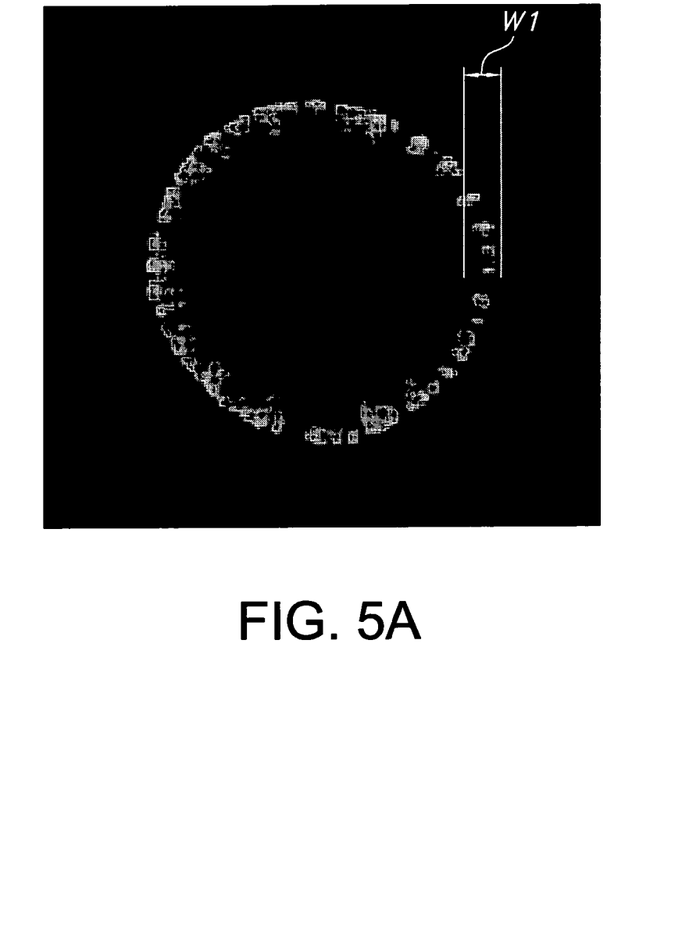
FIGS. 5a, 6a, and 7a are photographs showing configurations of annular synthetic jets.
Figure 5B:
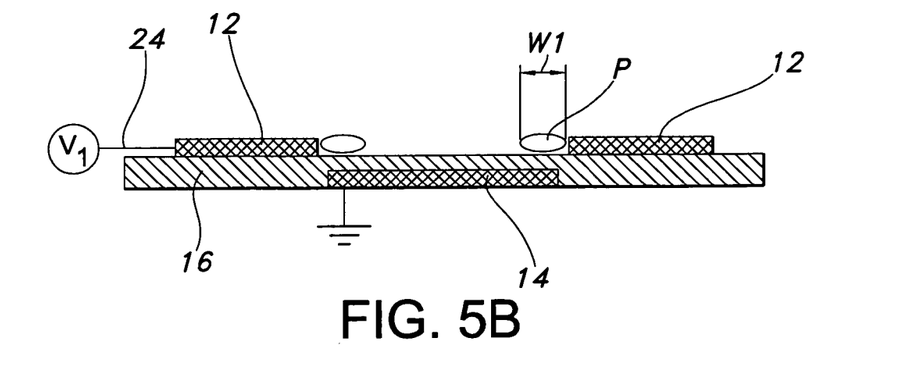
FIGS. 5b, 6b, and 7b are representative side views of the actuators of FIGS. 5a, 6a, and 7a, respectively.
Figure 6A:
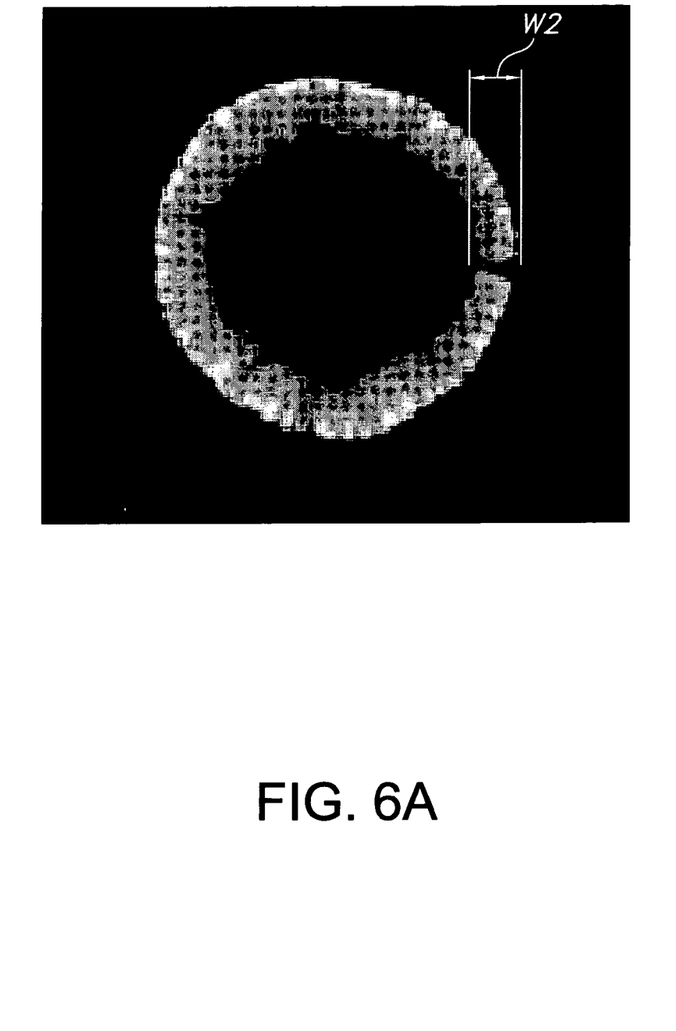
Figure 6B:
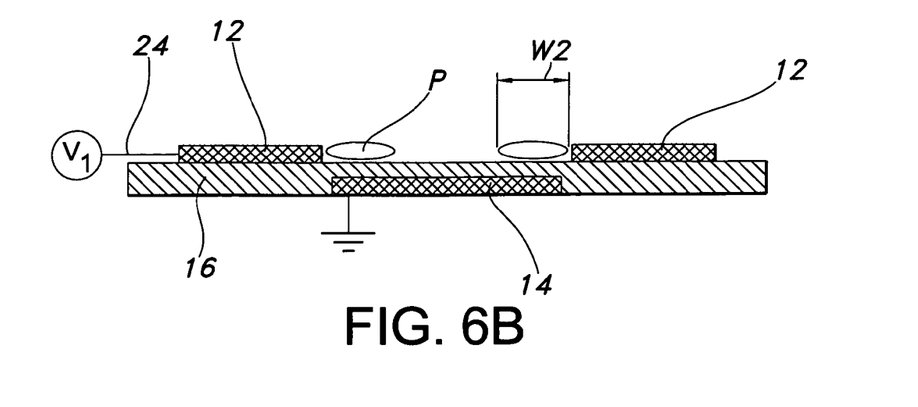
Figure 7A:
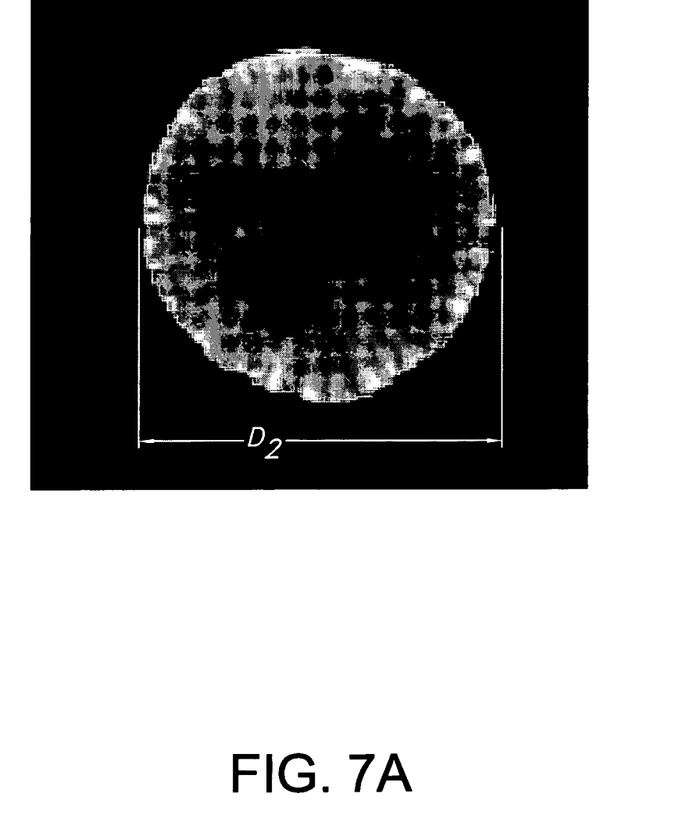
Figure 7B:
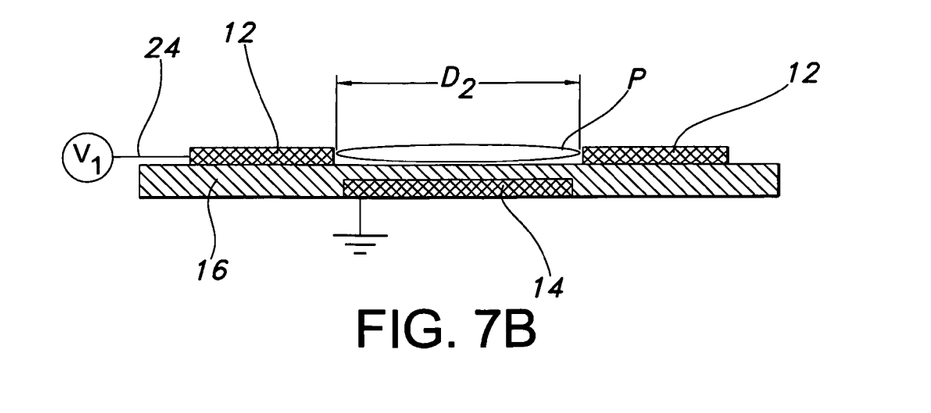

Varying the voltage being delivered to one of the conductors 12, 14, as well as the gap 22 between the edges of the conductors 12, 14, results in various configurations of synthetic jets or suction devices. For instance, applying a voltage between 3 kV and 4 kV to an actuator having a gap 22 of 0.04" produces an annular jet having a plasma P width $W_1$, as shown in FIGS. 5a and 5b. Increasing the voltage to between 4 kV and 5 kV and providing a gap 22 of 0.04" produces an annular jet having a plasma width $W_2$, which is greater than $W_1$ (FIGS. 6a and 6b). Further increasing the voltage to between 5 kV and 6 kV creates a substantially disc shaped jet spanning between the distance $D_2$ across the center aperture 18 of the first conductor 12 (FIGS. 7a and 7b). Accordingly, increasing the gap 22 increases the required voltage to achieve the same plasma width.

In addition to being able to modify the geometry of the synthetic jet created, a user may create both continuous synthetic jets and pulsed jets by fluctuating or pulsing the power source to the actuator 10. This provides an enhanced level of user control for modifying a fluid flow. Moreover, when configured as a suction device, fluctuating the power source to the actuator will create continuous suction and pulsed suction, as desired. Unlike conventional flow controls that enable only a single mode of operation, the present actuator 10 provides a single device that may be operated in multiple modes.

Figure 8A:
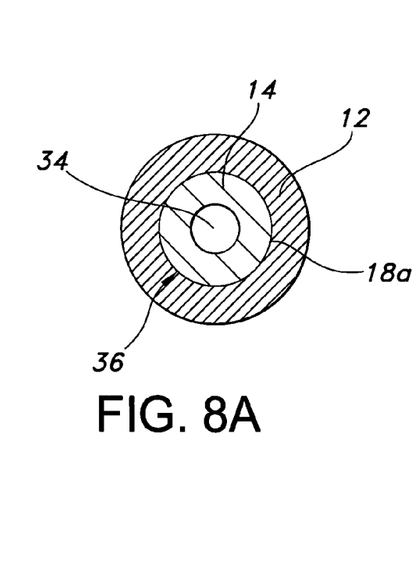
FIGS. 8a-8d are top views of various configurations of actuators.
Figure 8B:
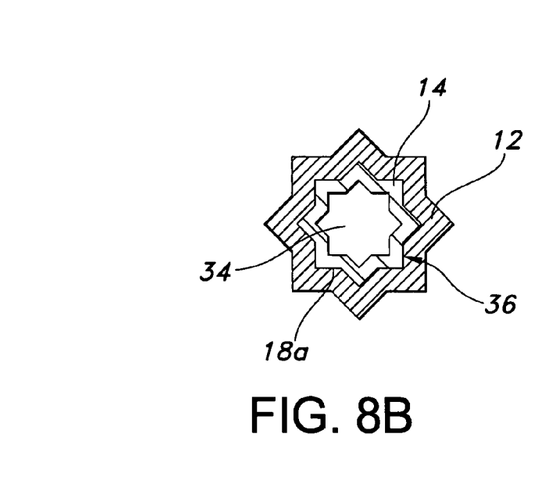
Figure 8C:
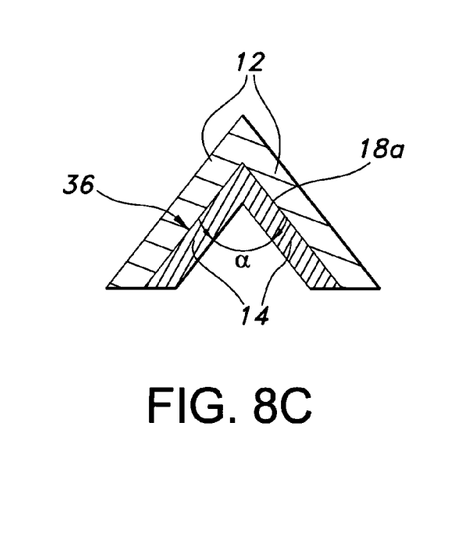
Figure 8D:
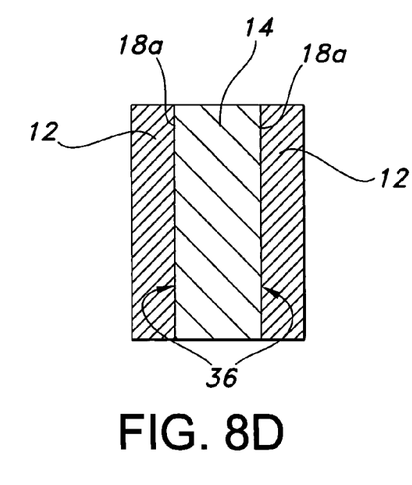
Figure 9:
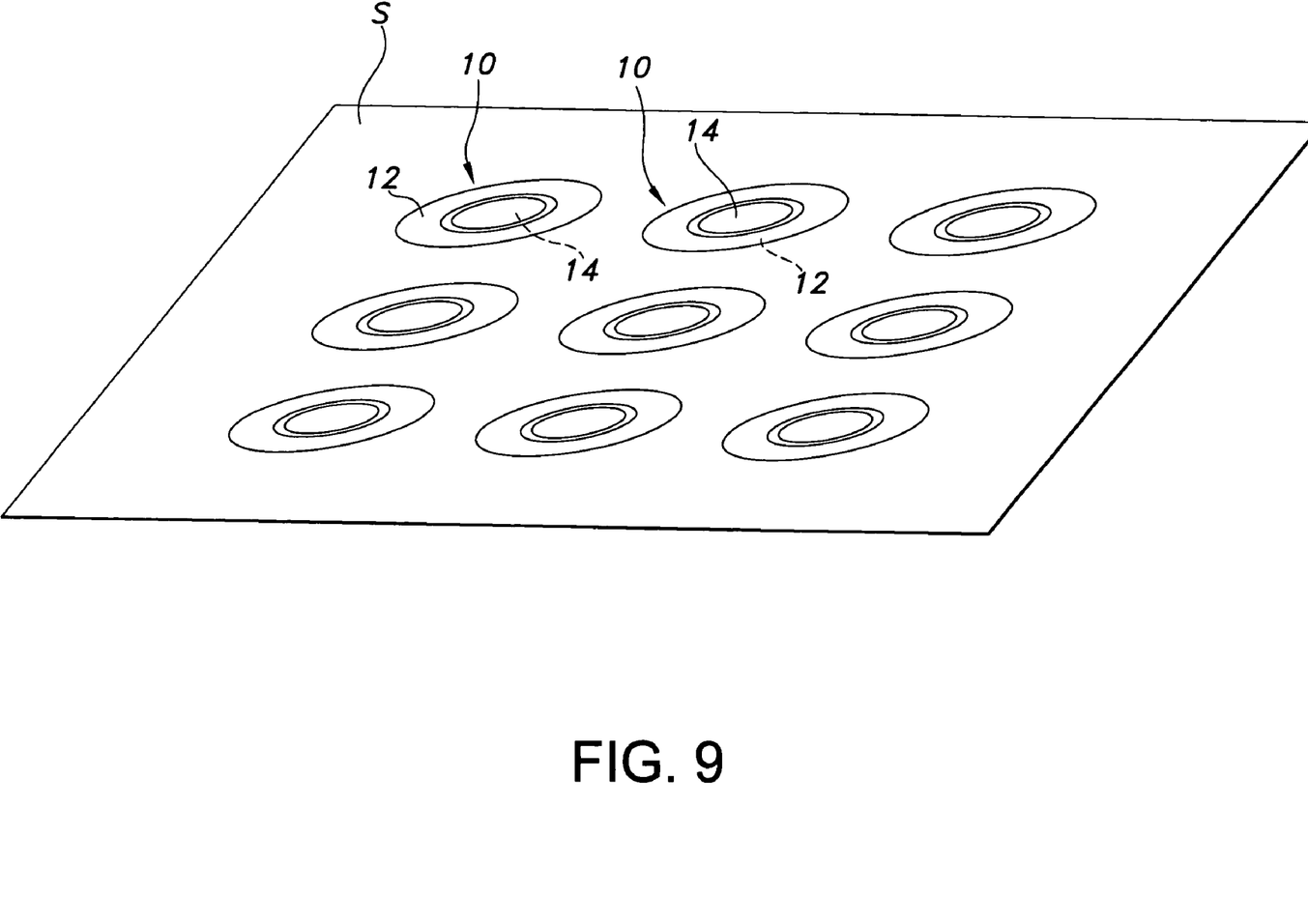
FIG. 9 is a perspective view of a plurality of actuators positioned on a surface.

Instead of the annular configuration previously disclosed, the actuator 10 may have any other geometrical configuration. For instance, the first and second conductors 12, 14 may be any shape that defines an aperture 34, such as multiple ring shapes (FIG. 8a) or a star shape (FIG. 8b). Alternatively, the conductors 12, 14 may be substantially "v"-shaped, thereby forming a chevron having an angle $\alpha$ between 1° and 179° when viewed from the top (FIG. 8c) or linear (FIG. 8d). One will appreciate that one or more edges 18a of the first conductor 12 may define a boundary 36, wherein the second conductor 14 is positioned within the boundary. For instance, the boundary 36 may be circular (FIG. 8a), star shape (FIG. 8b), "v"-shaped (FIG. 8c), a plurality of straight lines (FIG. 8d), or otherwise. Also, as opposed to using a single actuator 10, a plurality of actuators 10 may be positioned on a surface S, as an array (FIG. 9). Each actuator 10 may be independently controlled, thereby providing a user with further flow control. In any of these configurations, the actuator 10 and conductors 12, 14 may function as previously described.

Various experiments have been conducted or are proposed/envisioned to demonstrate the above-described actuator. Details of one such actuator experiment are provided in the following example.

EXAMPLE

Plasma actuators were created using a conductive copper tape material. One actuator was created in the form of an array of annular actuators, while the other was created in a linear fashion. A 0.025" thick alumina ceramic slab was used as the dielectric for a quiescent flow and flat plate boundary layer experiment, while KAPTON was used as the dielectric for a cylinder flow measurement.

The diameters of exposed and embedded conductors of the annular plasma synthetic jet actuator ("PSJA") tested were 1" and 0.5" respectively, with either no gap or a 0.04"-0.08" overlap. The dimensions of the linear synthetic jet actuator ("L-PSJA") used in both quiescent flow and flat plate experiments were chosen to match the PSJA, and the width of the exposed conductors and embedded conductor of the L-PSJA were 0.25" and 0.5" respectively, with no gap and a spanwise length of around 3.5". For quiescent flow measurements on the linear actuator, the width of the exposed and embedded conductors were about 6 mm, with spanwise lengths of around 3.5".

For the cylinder flow measurements, the exposed and embedded conductors for both L-PSJA and linear actuator were 0.20" in width (spanwise length of 20"), as the dimensions of the cylinder used was not large enough to accommodate the L-PSJA dimensions that matched the PSJA. The results for quiescent flow and flat plate boundary layer experiments were obtained for a nominal 5 kV amplitude, 2.8 kHz frequency square wave AC input, operated with a 50% duty cycle. A nominal 2 kV amplitude, 1.1 kHz frequency square wave AC input operated with a 50% duty cycle was used for the cylinder flow experiments. A function generator is used to provide a sinusoidal input to a KEPCO BPM-01 100 V power source. The output drives an non-inductively matched step-up transformer, whose output is sent to the conductors. Two step-up transformers were used during the course of the experiments, one capable of 6 kV output with 1-250 V RMS input at 1-7 kHz (Industrial Test Equipment Company, hereinafter "T-1") and the other capable of 5.5 kV output with 40 V RMS input at 6 kHz (Corona Magnetics, Inc., hereinafter "T-2"). For measurements made with T-2, the exposed and embedded conductors were driven with a 180° phase difference, while the embedded conductor was grounded whenever T-1 was used. The input power was monitored using a TEKTRONIX TDS channel oscilloscope, while a high voltage probe and current monitor were used for voltage and current measurements, respectively, to determine input power.

The results of this experiment show that the plasma synthetic jet actuator creates a flow structure very similar to that of a conventional synthetic jet, with a plasma induced jet being directed away from the surface, but without the need of any moving parts. The jet is a zero-mass flux since no additional fluid is added to the system, but it does add momentum, and can thus be used to add momentum to a fluid flow. The actuator can be turned on or off, or pulsed (such as, alternating on and off), so that input power to the actuator may be reduced. This also results in the actuator producing vortex rings instead of a steady jet which also may be beneficial.

The present invention presents a fluid actuator that can modify a flow of fluid without the need for moving parts. The actuator allows for activation and deactivation, as desired. The actuator can also be mounted substantially flush with a surface, such that it may modify the flow without significantly projecting into it. The actuator can also operate as a synthetic jet for directing flow away from the actuator, as well as a suction device for directing flow toward the actuator.

The foregoing discussion was chosen to provide the best illustration of the principles of the invention and its practical application to thereby enable one of ordinary skill in the art to utilize the invention in various embodiments and with various modifications suited to the particular use contemplated. For example, the gap 22 may be zero or there may be overlap of the conductors 12, 14. Although the diameters $D_1$, $D_2$ would preferably be no greater than 1", they may be any size. All modifications and variations are within the scope of the invention as determined by the appended claims when interpreted in accordance with the breadth to which they are fairly, legally and equitably entitled.

The invention claimed is:

1. A method of modifying a flow of fluid, comprising:
   mounting a plurality of conductors on a surface, at least one of said plurality of conductors defining an aperture;
   applying a voltage to at least one of the conductors, wherein the voltage creates a plasma; and
   creating a suction device with the plurality of conductors, thereby resulting in a fluid flow toward the surface.

2. The method of claim 1, wherein the mounting comprises positioning the plurality of conductors substantially flush with the surface.

3. The method of claim 1, wherein the applying a voltage comprises applying a substantially continuous voltage during the creating the suction device.

4. The method of claim 1, wherein the applying a voltage comprises pulsing the voltage during the creating the suction device.

5. A method of modifying a flow of fluid, comprising:
   mounting a plurality of conductors on a surface, at least one of said plurality of conductors defining an aperture;
   applying a voltage to at least one of the conductors; and
   creating a plasma synthetic jet actuator with the plurality of conductors, thereby resulting in a fluid flow towards or away from the surface.

6. The method of claim 5, wherein the mounting comprises positioning the plurality of conductors substantially flush with the surface.

7. The method of claim 5, wherein the applying a voltage comprises applying a substantially continuous voltage during the creating the synthetic jet actuator.

8. The method of claim 5, wherein the applying a voltage comprises pulsing the voltage during the creating the synthetic jet actuator.

9. A method of modifying a flow of fluid, comprising:
   mounting a first conductor on a first side of a dielectric, the first conductor having at least one edge that defines a boundary;
   mounting a second conductor on a second side of a dielectric, the second conductor is positioned within the boundary;
   applying a voltage to at least one of the conductors to modify a flow of fluid in communication with one of the first and second conductor.

10. A fluid actuator, comprising:
    a first and second conductor positioned on a dielectric, wherein one of the first and second conductor defines an aperture and whereby application of a voltage to the first conductor creates a plasma between the first and second conductor, thereby modifying a flow of a fluid in communication with the actuator.

11. The fluid actuator of claim 10, wherein the application of the voltage to the first conductor results in a fluid flow away from the actuator.

12. The fluid actuator of claim 10, wherein the application of the voltage to the first conductor results in a fluid flow toward the actuator.

13. The fluid actuator of claim 10, wherein the first conductor encircles the second conductor.

14. The fluid actuator of claim 10, wherein the first conductor is substantially ring shaped and the second conductor is circular.

15. The fluid actuator of claim 14, further comprising a gap between the first conductor and the second conductor.

16. A system for modifying a fluid flow, comprising:
    a surface; and
    an actuator including a first and second conductor positioned on a dielectric wherein one of the first and second conductor defines an aperture, and whereby the actuator is connected to the surface and application of a voltage to the first conductor creates a plasma between the first and second conductor, thereby directing a flow of a fluid in communication with the actuator towards or away from the surface.

17. The system of claim 16, wherein the actuator is substantially flush with the surface.

18. The system of claim 16, wherein the application of the voltage to the first conductor results in a fluid flow away from the actuator.

19. The system of claim 16, wherein the application of the voltage to the first conductor results in a fluid flow toward the actuator.

20. The system of claim 16, wherein one of the first and second conductor is embedded in the surface.

21. The system of claim 16, wherein the surface includes a plurality of actuators, each independently controlled.

22. The system of claim 16, wherein one of the first and second conductor defines an aperture.

23. The system of claim 22, wherein the first conductor is substantially ring shaped and the second conductor is circular.

24. A fluid actuator, comprising:
    a first conductor positioned on a first side of a dielectric, the first conductor has at least one edge that defines a boundary; and
    a second conductor positioned on a second side of a dielectric, wherein the second conductor is positioned within the boundary, and application of a voltage to one of the first and second conductor creates a plasma, thereby modifying a flow of fluid in communication with one of the first and second conductor.

25. The fluid actuator of claim 24, wherein the first and second conductor are substantially "v"-shaped.

* * * * *